United States Patent [19]
Huslin, Jr.

[11] 3,771,346
[45] Nov. 13, 1973

[54] CALIBRATING DEVICES

[75] Inventor: Theodore J. Huslin, Jr., Richboro, Pa.

[73] Assignee: Moore Products Co., Spring House, Pa.

[22] Filed: June 21, 1972

[21] Appl. No.: 264,886

[52] U.S. Cl. .................................. 73/1 B, 73/141 A
[51] Int. Cl. ............................................ G01l 25/00
[58] Field of Search ...................... 73/1 B, 1 R, 3, 4, 73/141 A, 141 R, 517 AV, DIG. 1

[56] References Cited
UNITED STATES PATENTS
3,464,255  9/1969  Davidson et al. .............. 73/517 AV
3,393,565  7/1968  Klee ................................ 73/DIG. 1
3,287,957  11/1966  Martens ............................... 73/1 B Primary Examiner—James J. Gill
Attorney—Zachary T. Wobensmith, 2nd

[57] ABSTRACT

Structure is disclosed for applying a predetermined force for calibrating an instrument of the force bar type which controls the vibration of a tension element whose tension is related to an input force applied on the force bar, the calibrating force applying structure including a spring urged member selectively applying a predetermined force on the force bar.

7 Claims, 3 Drawing Figures

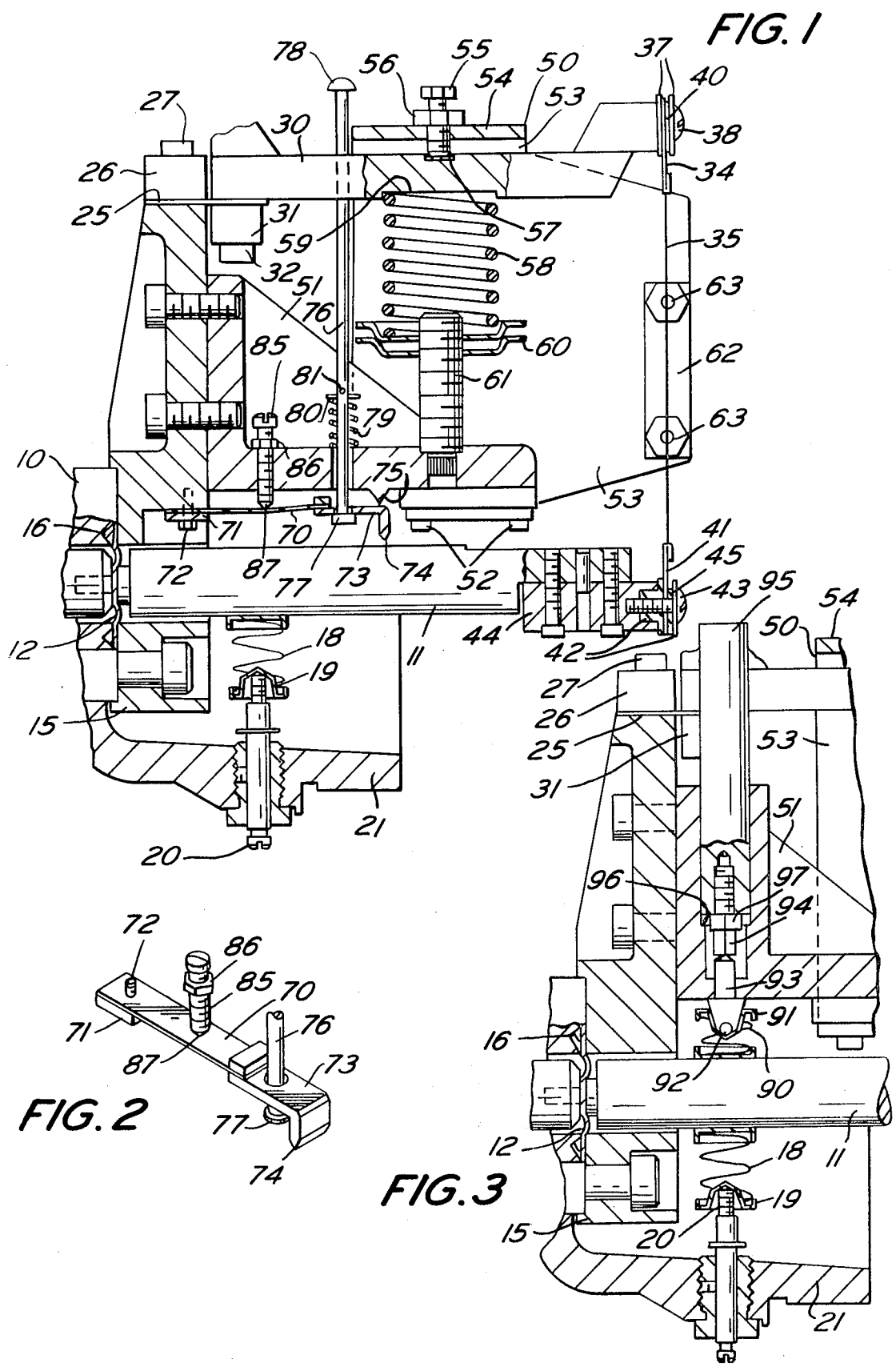

3,771,346

CALIBRATING DEVICES

BACKGROUND OF THE INVENTION

1. Field of the Invention

This invention relates to calibrating devices and more particularly to apparatus for applying a calibrating input force onto a force responsive element controlling the tension in a vibrating element.

2. Description of the Prior Art

It has heretofore been proposed to employ a pivoted force lever with differential pressures applied thereto from opposite sides of an orifice plate, flow nozzle, Venturi or similar device.

Bowditch, in U.S. Pat. No. 2,806,480 shows one such device. The output signal derived from the pivoted force lever varies linearly with input differential pressure and, therefore, is not linear with the flow through the orifice plate or similar devices.

It has also heretofore been proposed, as described in Measurements and Data, November – Dec. 1969, published by Measurements and Data Corporation, Pittsburgh, Pa., to make a vibrating wire transducer wherein the frequency of vibration is a measure of the tensile force applied to the wire. These attempts have been limited to operation over a narrow range of relatively high frequencies in order to obtain an approximate linear relationship between the frequency and force or tension. Because of the limited rangeability of frequency over which operation is obtained, these units could not be applied to measure flow on a linear scale starting near zero.

In the prior application of Robert B. Adams, filed Feb. 25, 1972, Ser. No. 229,367 for FLOW MEASURING APPARATUS, improvements have been set forth for making the frequency of vibrations of a vibrating element proportional to the square root of the tension in said element over a much wider range of tension than had heretofore been possible. The frequency range approaches but does not include the point of zero frequency which corresponds to an input of zero force. The usual calibrating procedure for setting zero by adjusting the output to zero, when the input force is at zero, cannot be employed with this transducer because the output frequency never reaches zero even with zero input force because of stiffness inherent in any member having a finite thickness in the direction of vibration. To calibrate a transducer of this type requires that an input force to the beam be applied which will bring the frequency above the threshold where the square root relationship is established. It has been suggested that an external differential pressure be utilized to furnish such a force but this requires cumbersome and inconvenient equipment.

SUMMARY OF THE INVENTION

In accordance with the invention, self contained provisions are made for calibrating an instrument of the force bar type which controls the vibration of a tension element whose tension is related to an input force applied on the force bar which provisions include structure for applying a predetermined calibrating force onto the force bar which is convenient, reliable and simple.

It is a further object of the invention to provide calibrating apparatus of the character aforesaid which is built into the instrument so as to be ready for use, and which is ineffective during normal operation of the force bar.

It is a further object of the invention to provide calibrating apparatus which is simple but effective in its action.

Other objects and advantageous features of the invention will be apparent from the description and claims.

BRIEF DESCRIPTION OF THE DRAWINGS

The nature and characteristic features of the invention will be more readily understood from the following description taken in connection with the accompanying drawings forming part hereof, in which:

FIG. 1 is a vertical sectional view of flow measuring apparatus having one form of calibrating apparatus in accordance with the invention applied thereto;

FIG. 2 is a view in perspective of the calibrating apparatus as employed in FIG. 1; and FIG. 3 is a vertical sectional view of flow measuring apparatus having another form of calibrating apparatus in accordance with the invention applied thereto.

It should, of course, be understood that the description and drawings herein are illustrative merely and that various modifications and changes can be made in the structure disclosed without departing from the spirit of the invention.

Like numerals refer to like parts throughout the several views.

DESCRIPTION OF THE PREFERRED EMBODIMENTS

Referring now more particularly to FIGS. 1 and 2 of the drawings, a casing 10 is provided having a force lever 11 carried by a resilient diaphragm 12 which serves as a fulcrum, the diaphragm 12 being secured to the lever 11 and clamped between the housing section 10 and a housing section 15 with a packing 16 engaged therewith for preventing fluid leakage at this location.

The force bar or lever 11, for purposes of illustration, can be similar to that shown and described in the application of Robert B. Adams, identified above, and may be subject to differential pressure applied thereon or may be responsive to some other variable input force or forces.

The force lever 11 can have an adjustable zero spring 18 engaged therewith and with a spring abutment 19 which is engaged by an adjusting screw 20 carried in a housing extension 21.

The housing section 15 may also have a flat resilient hinge plate 25 secured thereto by a clamp bar 26 and bolt 27. The hinge plate 25 has a frame bar 30 secured thereto by a clamp bar 31 and bolt 32.

The frame bar 30 at its free end has a band terminal 34 for one end of a metallic band 35 secured to bar 30 by insulating washers 37 and bolt 38. The band 35 is welded to the band terminal 34. A connector clip 40 for electrical contact with the clamp 34 is also carried on the bolt 38. The other end of the metallic band 35 has a band terminal 41 welded thereto and the band terminal 41 is secured by clamping and insulating washers 42 and bolt 43 to a clamping plate 44. A connector clip 45 for electrical contact with the band terminal 41 is also carried on the bolt 43.

The metallic band 35 is a band of unitary construction of a material having high ultimate strength such as a very thin ribbon or conductive filaments which can develop sufficient strength to withstand the forces applied thereon, and at the same time have a low natural frequency of oscillation when unstressed.

A static pressure adjustment is provided for the metallic band 35 and for this purpose a yoke 50 is provided held in engagement with a bracket 51 on the housing section 15 by bolts 52 and with upwardly extending side plate portions 53 and a top connecting plate portion 54. An adjusting screw 55 having a lock nut 56 thereon engages a wear insert 57 in the upper face of the frame bar 30. A spring 58 in a recess 59 in the lower face of the bar 30 is engaged at the other end in an abutment cup 60 in threaded engagement with a screw 61 anchored in the bracket 51. The positioning of the abutment cup 60 permits of adjustment of the tension of the spring 58 while the screw 55 permits of adjustment of the position of the frame bar 30.

The adjusting screw 55 is incorporated to change the position of the frame bar 30 to which the band 35 is connected. This is necessary to obtain the proper operating position of the force lever 11 so that the pressure drop across the high pressure seal 16 at the diaphragm 12 which also serves as the force lever pivot, introduces a minimum torque on the force lever 11, so as not to subtract from or add to, the input force applied to the force lever 11.

The side plate portions 53 have oppostie sources of magnetic flux carried thereby such as permanent magnets 62 and held in position by screws 63. The band 35 has its major portion disposed in the field between the magnets 62.

Provision is made for supplying an electric current flow through the band 35 for interaction with the magnetic field from the magnets 62.

The frequency of oscillation of the band 35 may be utilized in any desired manner.

An adjustment is provided at the screw 20 to produce a condition equivalent to having zero tension on the band 35 when there is no flow induced force applied on the force bar 11.

But, in order to make this adjustment properly a calibrating force is required which will provide sufficient tension on the band 35 to insure that it will vibrate within the range where frequency is proportional to the square root of the tension.

For this purpose a resilient lever 70 can be employed, secured at one end to the housing section 15 by a plate 71 and bolt 72. A control bracket 73 is mounted on the end of the lever 70 and has a downwardly projecting terminal end 74 for engagement with the force bar 11. A stop 75 on the bracket 51 limits the upward movement of the lever 70.

The lever 70 is normally held out of engagement with the force bar 11 by a control rod 76 having an enlarged head 77 on the lower end engaging the bracket 73. The rod 76 extends through the bracket 51, and through the frame bar 30 and has an upper head 78 for manual actuation downward. The rod 76 is normally urged upwardly and held in its upward position by a spring 79 engaged with a collar 80. The collar 80 is held against upward movement by a pin 81.

An adjusting bolt 85 is in threaded engagement in the bracket 51, has a lock nut 86 thereon, and has a pointed end 87 for engagement with the lever 70 for adjusting the force exerted by the lever 70 against the force bar 11 in its downward position.

The lever 70 is released for exerting its predetermined force on the force bar 11 by downward movement of the rod 76 to a position to free the head 77 from engagement with the lever 70.

Referring now to FIG. 3 in place of the lever 70 a spring 90 is provided in engagement at its lower end with the force bar 11. The upper end of the spring 90 is carried in a spring abutment 91 with which a ball 92 is in engagement. A vertically movable pin 93 carried in the bracket 51 is in engagement with the ball 92 and has a control pin 94 in engagement therewith, the pin 94 being adjustably carried in threaded engagement in a manual actuating pin 95 which extends through the frame bar 30 for manual accessibility. A lock nut 97 may be provided on the pin 94. The pin 95 is limited in its downward movement by engagement with a shoulder 96. The extent of downward movement of the pin 95, as determined by the shoulder 96 and the adjustment of the pin 94, determines the extent of compression of the spring 90 on the force bar 11 as a calibrating force. The change in force applied by the spring 90 upon movement of the pin 95 is thus utilized as the calibrating force.

For purposes of calibration and with the force bar free from the application of any input force attendant on the differential resulting from flow or other quantity to be measured, the calibrating force can be applied on the force bar 11.

In the form of the invention shown in FIGS. 1 and 2 the calibrating force is applied by the lever 70 upon release by downward pressure on the head 78 of the pin 76.

In the form of the invention shown in FIG. 3, the calibrating force is applied from the spring 90 upon downward movement of the actuating pin 95 and predetermined compression of the spring 90.

The effect of the calibrating force applied to the force bar 11 is effective for tensioning the band 35 to a predetermined extent which tensioning will provide a signal for calibration at a level above but close to zero and/or zero flow.

I claim:

1. In measuring apparatus,
a force bar having a pivotal mounting,
means for applying an input force on said force bar on one side of said pivotal mounting,
a vibrating element connected to said force bar on the other side of said pivotal mounting and whose tension is proportional to the input force applied on said force bar,
calibrating means for establishing a significant frequency of vibration in said vibrating element when said input force is at zero,
said calibrating means comprising a force exerting member for exerting a predetermined calibrating force on said force bar on said other side of said pivotal mounting, and
means for rendering said force exerting member ineffective during normal operation of said force bar.

2. Measuring apparatus as defined in claim 1 in which said calibrating force exerting member has a resilient member in engagement therewith, and
a movable element is provided for altering the effect of said resilient member with respect to said force bar.

3. Measuring apparatus as defined in claim 1 in which said means for rendering said force exerting member ineffective includes a manually operable member movable to a position for rendering said calibrating force exerting member effective.

4. Measuring apparatus as defined in claim 1 in which said calibrating means has an adjustable portion for determining the magnitude of the calibrating force.

5. Measuring apparatus as defined in claim 2 in which a manually operable member is provided for releasing said resilient member for force application.

6. Measuring apparatus as defined in claim 5 in which said resilient member is a leaf spring, and
an adjusting member is provided in engagement with said leaf spring for determining the calibrating force.

7. Measuring apparatus as defined in claim 5 in which said manually operable member has a resilient retracting member in engagement therewith.

* * * * *